United States Patent
Benito-Navazo

(12) 
(10) Patent No.: US 6,494,414 B2
(45) Date of Patent: Dec. 17, 2002

(54) RETAINER DEVICE FOR CONDUCTORS IN AN ELECTRICAL RACEWAY

(75) Inventor: Juan Manuel Benito-Navazo, Barcelona (ES)

(73) Assignee: Aparellaje Electrico, S.A., Barcelona (ES)

( * ) Notice: Subject to any disclaimer, the term of this patent is extended or adjusted under 35 U.S.C. 154(b) by 0 days.

(21) Appl. No.: 09/731,798

(22) Filed: Dec. 8, 2000

(65) Prior Publication Data

US 2001/0006208 A1 Jul. 5, 2001

(30) Foreign Application Priority Data

Dec. 30, 1999 (ES) .............................. 9903277

(51) Int. Cl.⁷ .............................. H02G 3/04
(52) U.S. Cl. .................... 248/68.1; 174/68.3; 174/101
(58) Field of Search .................. 248/61, 63, 68.1, 248/74.1, 49; 174/48, 49, 68.3

(56) References Cited

U.S. PATENT DOCUMENTS

| | | | | |
|---|---|---|---|---|
| 3,890,459 A | * | 6/1975 | Caveney | 174/101 |
| 4,136,257 A | * | 1/1979 | Taylor | 174/68.3 |
| 4,937,400 A | * | 6/1990 | Williams | 174/95 |
| 5,602,364 A | * | 2/1997 | Ustin | 174/68.3 |
| 5,685,113 A | * | 11/1997 | Reuter et al. | 52/220.7 |
| 6,235,988 B1 | * | 5/2001 | Karst et al. | 174/48 |
| 2001/0022231 A1 | * | 9/2001 | Dyer | 174/48 |

FOREIGN PATENT DOCUMENTS

| | | | |
|---|---|---|---|
| DE | 2 245 626 | | 8/1973 |
| DE | 2245626 | * | 8/1973 |
| ES | U196298 | | 10/1975 |
| ES | U199304 | | 12/1975 |
| FR | 2 777 130 | | 10/1999 |
| GB | 1 340 553 | | 12/1973 |
| GB | 1340553 | * | 12/1973 |

* cited by examiner

*Primary Examiner*—Leslie A. Braun
*Assistant Examiner*—Deborah M. Brann
(74) *Attorney, Agent, or Firm*—Staas & Halsey LLP

(57) ABSTRACT

A retainer device for conductors in an electrical raceway, which is applicable to raceways formed by the association of a U-shaped base section with a cover section. The base section is provided in the walls thereof with equidistant narrow transverse slots which define therebetween outstanding transverse tabs or strips which form a comb-like arrangement. The device is formed by an open narrow annular member of a right prismatic profile, the bottom portion thereof corresponds to the right internal cross section of the base section, of the raceway to which it is directed. The member has a bottom portion, two wall portions and two free end portions. The two free end portions are located at the level of the open side of the base section and face each other in an overhanging fashion and are partially overlapping. The two wall portions are provided with projections to interact with the walls and/or with the wall portion of an adjacent member.

24 Claims, 2 Drawing Sheets

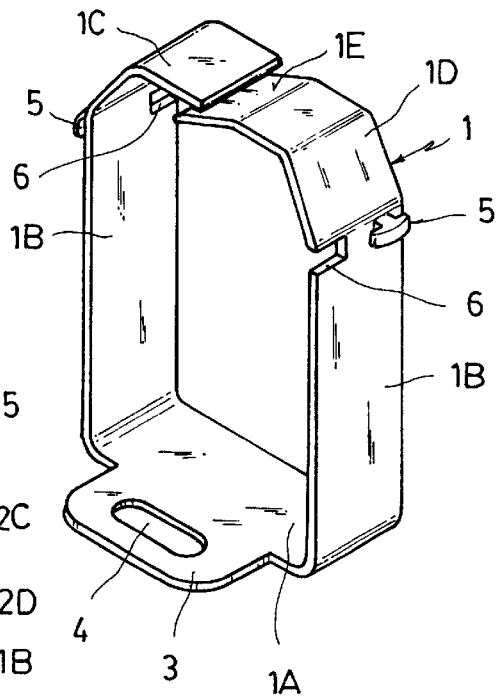
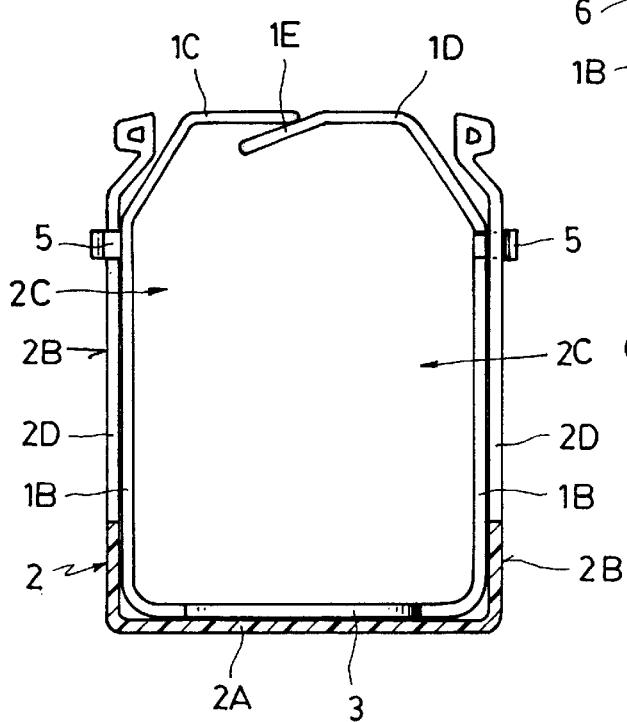
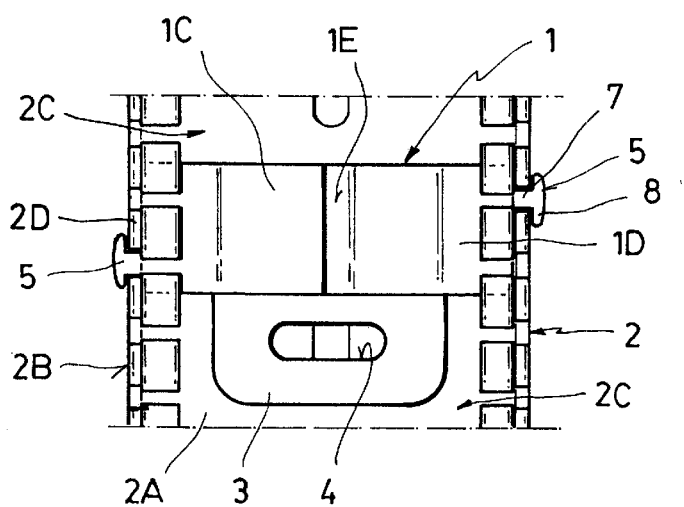

RETAINER DEVICE FOR CONDUCTORS IN AN ELECTRICAL RACEWAY

FIELD OF THE INVENTION

This invention relates to a retainer device for conductors in an electrical raceway, particularly one which allows the electrical conductors to be kept grouped together in a bundle, the conductors being housed in a raceway of the type formed by a U-shaped base section defining side walls and a bottom wall, associated with a flattened cover section, with the ensemble defining a raceway and, more particularly, in one of these raceway in which the base section is provided in the walls thereof with equal equidistant narrow transverse slots which define therebetween tabs which, jointly, form a comb-like arrangement. The invention also relates to the use of a retainer according to the invention.

PRIOR ART

Devices for retaining the electrical conductors of a bundle thereof contained in a raceway having walls devoid of openings are known. Such retainers are attached only to the bottom wall of the duct and are provided with means for locating longitudinal dividing members, such as those disclosed in Spanish utility model 196,298, in which the retainer device is formed by a warped, closed annular member and in Spanish utility model 199,304, in which the retainer device is formed by a plurality of open stirrups defined by arrangements of pairs of walls which, extending from a common base, project the free ends thereof inwardly in curved confronting form, leaving a narrow open passage therebetween. In both cases of the above retainer devices, it so happens that a device is required for each width of raceway, whereby the transverse linking thereof is not contemplated. Furthermore, means for inserting longitudinal sheet-like partitions are contemplated in both cases.

The known retainer devices, the purpose of which is to prevent the electrical conductors from coming out of the raceway when the cover is removed therefrom for working on the conductors, have one or another of the drawbacks listed hereafter: to insert a new conductor in the bundle it must be threaded through the retainer devices, when these are of the closed type; where the retainer devices are open, the passage therein reduces the reliability of retention; and, in all cases, the devices are attached only to the bottom wall of the raceway, whereby since they do not bind the raceway walls together, no increase in the strength thereof is achieved.

SUMMARY OF THE INVENTION

Thus, with a view to overcoming the above drawbacks, the solution has been adopted of giving the retainer devices the structure of openable rings which are attached to the bottom wall and to the side walls of the raceway and which may be coupled together transversely to be adapted to all widths of the raceways with a minimum number of elements.

According to the foregoing solution, the retaining device of the invention has been developed. It is formed by an open narrow annular member of right prismatic profile. The sides thereof correspond to the right internal cross section of the raceway base section to which it is directed. The member is provided with a bottom portion, two wall portions and two free end portions, all mating with the internal shape of the said base section. The two free end portions are located at the level of the open side of the base section, facing each other in overhanging fashion and partly overlapping, at the same time as the two wall portions are provided with connecting means interacting with the walls of the base section and/or with the wall portion of an adjacent member, and the bottom portion is provided with means for connection to the bottom wall of the raceway base section.

It is a feature of the invention that the narrow annular members are provided on the surfaces of the wall portions thereof which contact the inner surfaces of the raceway base section side walls with a retaining projection as means for connecting them to the said base section walls. It is likewise contemplated that the retaining projections of one and the other of the wall portions of the narrow annular members are situated in the center of the width of said wall portions or are located at opposite edges, so as to be symmetrical about a point.

A further feature of the invention is that the retaining projections may be anchored to the walls of the raceway base section through the narrow slots of the latter and on two adjacent transverse strips thereof. To this end, the retaining projections are T-shaped, where the stem has the same width as the narrow slots of the raceway base section and a length equal to the thickness of the base section walls and the passage of the companion transverse cutaways, while the free arms of the crossbar are shorter than half of the width of the transverse strips against which they bear.

Yet a further feature of the invention is that the narrow annular members are provided at the two wall portions thereof with a transverse notch which is disposed at the same level as the retaining projections and on the opposite edges thereto and is dimensioned such as to allow engagement with the stem of the projection of the wall portion of an adjacent annular member.

According to the invention, the base portion is extended transversely by at least one tab which is provided with an aperture and allows the accessory to be attached to the bottom wall of the raceway in which it is located or to a support surface.

Also according to the invention, the two free end portions are slightly overlapping, the portion situated in the lower position being slightly inclined, and have the end edges thereof rounded.

Finally according to the invention, it is also contemplated that the narrow annular member of prismatic profile may be provided with an inner partition wall, parallel to the wall portions. This partition extends from the bottom portion and is provided at the free end thereof with a terminal acting with the free end portions in the sense of facilitating the insertion of the electrical cables and preventing accidental removal therefrom.

A further object of the invention is the use of said retainer devices, which are for retaining conductors in raceways, preferably if said raceways are of the type formed by the association of a U-shaped base section with a cover section, of flattened shape, in which said base section is provided on the walls thereof with a plurality of equal equidistant narrow slots defining therebetween outstanding tabs or transverse strips which, jointly, form a comb-like arrangement.

BRIEF DESCRIPTION OF THE DRAWING

To facilitate the understanding of the foregoing ideas, there is described hereinafter one embodiment of the invention, with reference to the accompanying drawings, in which:

FIG. 1 a perspective view of an open narrow annular member forming the retainer vice of the invention.

FIG. 2 a front elevation view of the retainer device of FIG. 1 after engagement in raceway provided with slotted walls, the raceway being shown in section.

FIG. 3 is a fragmentary plan view of the ensemble shown in FIG. 2.

DETAILED DESCRIPTION OF THE INVENTION

The retainer device according to the invention is formed, as shown in FIG. 1, by an open narrow annular member 1 having a right prismatic profile, the walls of which correspond with the inner section of the U-shaped base section 2 of the raceway for which it is intended.

The open annular member 1 comprises a bottom portion 1A, two equal wall portions 1B and two free end portions 1C and 1D, all of them mating with the internal shape of the said base section 2.

The bottom portion 1A is provided with means for connection with the bottom wall 2A of the base section 2 of the raceway, consisting at least of a transverse tab-like extension 3 which is provided with an elongate hole 4 and allows the retainer device to be fixed, through the bottom wall 2A of the base section 2 of the raceway, to a support surface (not shown).

Figure 4:
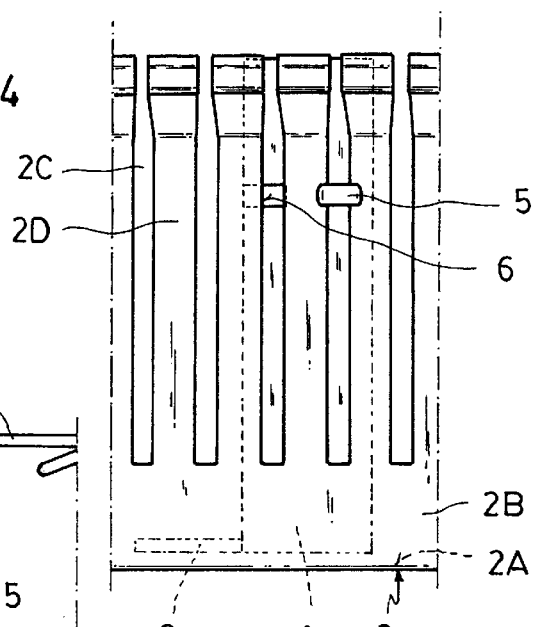
FIG. 4 is a side elevation view of the ensemble shown in FIG. 2.
Figure 5:
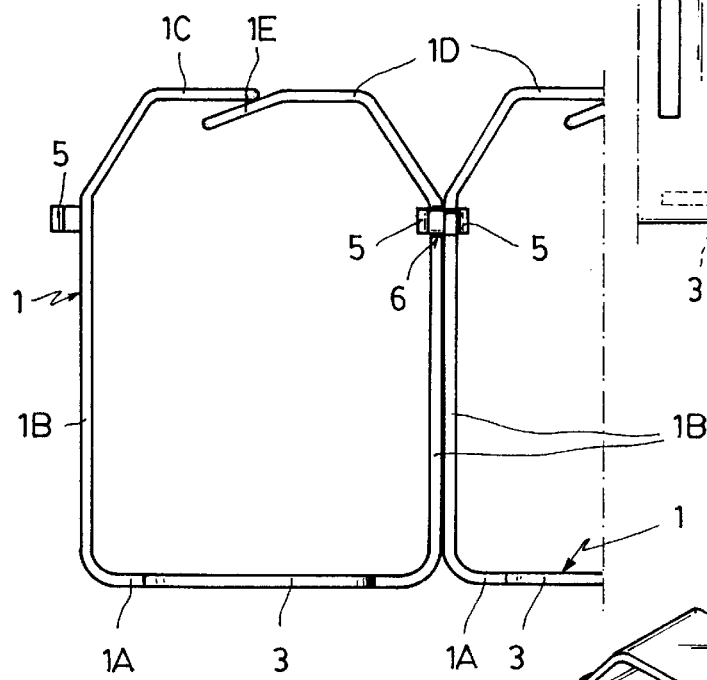
FIG. 5 is a front elevation view of the lateral engagement of two retainer devices, on them being shown in part.

Both wall portions 1B engage the inner surfaces of the walls 2B of the base section 2 of the raceway, which walls are formed with narrow slits 2C and transverse tabs or strips 2D, and are provided with a retaining projection 5 as means for engagement thereof with said walls 2B, as may be appreciated in FIGS. 2, 3 and 4, and with the wall portion 1B of an adjacent open annular member 1, as shown in FIG. 5.

Figure 6:
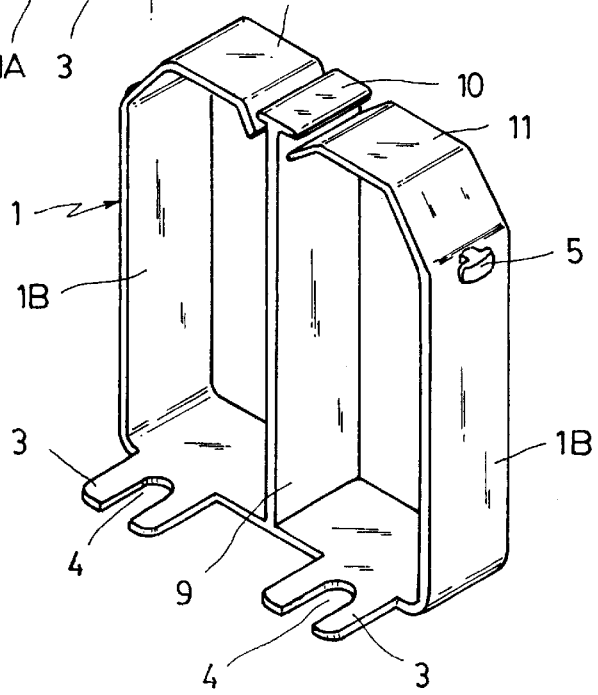
FIG. 6 is a view similar to FIG. 1 showing a retainer device according to the invention, provided with a center partition wall.

The retaining projections 5 of one and the other of the wall portions 1B are situated in the center of the width thereof, as shown in FIG. 6, or are situated at opposite edges, as shown in FIG. 1. In this latter case, furthermore, said wall portions 1B are provided with a transverse notch 6 which is disposed at the level of the retaining projections 5 on opposite edges thereto and are mutually symmetrical relative to a point and are dimensioned such as to allow the lateral engagement of two open annular members 1, as may be seen in FIG. 5.

The retaining projections 5 may be anchored to the walls 2B of the base section 2 of the raceway, through the narrow slits 2C and on the tabs 2D of the walls 2B.

Said retaining projections are T-shaped, in which the stem 7 is as wide as the narrow slits 2C and as long as the thickness of the walls 2B of the base section 2 and the width of the passages through said slits 2C, while the free arms of the cross bar 8 are as long as or shorter than half the width of the transverse tabs of strips 2D.

Both free end portions 1C and 1D are situated at the level of the open side of the said base section 2 and face each other in overhanging and slightly overlapping fashion. The free end portion 1C is disposed above the free end portion 1D which is provided with a slightly sloping portion 1E and rounded end edges.

The open annular members 1 may be provided with an internal partition wall 9, as shown in FIG. 6, parallel to the wall portions 1B thereof. The partition wall 9 extends from the bottom portion 1A and is provided at the free end thereof with a termination 10 which co-operates with the free ends 11 thereof to facilitate the insertion of the electrical conductors and hinder removal thereof.

What I claim is:

1. A retainer device for conductors in an electrical raceway, wherein said raceway is formed by the association of a U-shaped base section defining side walls and a bottom wall, with a flattened cover section, forming a raceway in which said base section is provided in the side walls thereof with equal equidistant narrow transverse slots which define therebetween outstanding transverse tabs or strips, wherein said device is formed by an open narrow annular member of right prismatic profile, said narrow annular member being provided with a bottom portion, two wall portions and two free end portions, all mating with the internal shape of said base section, where the bottom portion of said prismatic profile corresponds to the right internal cross section of said raceway base section, said narrow annular member being provided with a bottom portion, two wall portions and two free end portions, all mating with the internal shape of said base section, where said two free end portions are located at the level of the open side of said base section, are facing each other in overhanging fashion and are partly overlapping, at the same time as said two wall portions are provided with connecting means for interacting with said side walls of said base section of said raceway and said bottom portion is provided with means for connection to said bottom wall of said raceway base section and wherein said narrow annular member is provided on the surfaces of the wall portions which contact the inner surfaces of the raceway base section side walls with a retaining projection as means for connecting said narrow annular members to the said side walls of the base section.

2. The device of claim 1, wherein the retaining projections of one and the other of the wall portions of the narrow annular member is situated in the center of the width of said wall portions.

3. The device of claim 1, wherein the retaining projections of one and the other of the wall portions of the narrow annular members are situated at opposite edges, so as to be symmetrical about a point.

4. The device of claim 1, wherein the retaining projections may be anchored to the side walls of the raceway base section through the narrow slots of the latter and on two of the adjacent transverse strips thereof.

5. The device of claim 1, wherein the retaining projections are T-shaped, where the width of a stem of the retaining projections is adapted to be the same as the width of the slots of the raceway base section, the length of the stem of the retaining projection is adapted to be equal to the thickness of the walls of the raceway base section and free arms of the crossbar are adapted to be shorter than half of the width of the transverse strips against which they bear.

6. The device of claim 1, wherein the narrow annular members are provided at the two wall portions thereof with a transverse notch which is disposed at the same level as the retaining projections and on the opposite edges thereto and is dimensioned to allow engagement with the stem of the projection of the wall portion of an adjacent narrow annular member.

7. The device of claim 1, wherein the bottom portion is extended transversely by at least one tab which is provided with an aperture and allows the annular member to be attached through the bottom wall of the raceway in which it is located to a support surface.

8. The device of claim 1, wherein the two free end portions are slightly overlapping, the portion situated in the lower position being slightly inclined.

9. The device of claim 1, wherein the two free end portions have rounded end edges.

10. A retainer device for conductors in an electrical raceway, where said raceway is formed by the association of a U-shaped base section defining side walls and a bottom wall, with a flattened cover section, forming a raceway in which said base section is provided in the side walls thereof with equal equidistant narrow transverse slots which define therebetween outstanding transverse tabs or strips, wherein said device is formed by an open narrow annular member of right prismatic profile, said narrow annular member being provided with a bottom portion, two wall portions and two free end portions, all mating with the internal shape of said base section, where the bottom portion of said prismatic profile corresponds to the right internal cross section of said raceway base section, wherein said two free end portions are located at the level of the open side of said base section at the same time as said two wall portions are provided with connecting means for interacting with said side walls of said base section of said raceway and said bottom portion is provided with means for connection to said bottom wall of said raceway base section and wherein said narrow annular member is provided on the surfaces of the wall portions which contact the inner surfaces of the raceway base section side walls with a retaining projection as means for connecting said narrow annular member to said side walls of the base section and wherein the narrow annular member of the prismatic profile may be provided with an inner partition wall, parallel to the wall portions and which extends from the bottom portion and is provided at the free end thereof with a terminal co-acting with the free end portions in the sense of facilitating the insertion of the electrical cables and preventing accidental removal therefrom.

11. The device of claim 10, wherein the retaining projections of one and the other of the wall portions of the narrow annular member is situated in the center of the width of said wall portions.

12. The device of claim 10, wherein the retaining projections of one and the other of the wall portions of the narrow annular member is situated at opposite edges, so as to be symmetrical about a point.

13. The device of claim 10, wherein the retaining projections may be anchored to the side walls of the raceway base section through the narrow slots of the latter and on two of the adjacent transverse strips thereof.

14. The device of claim 10, wherein the retaining projections are T-shaped, where the width of a stem of the retaining projections is adapted to be the same as the width of the slots of the raceway base section, the length of the stem of the retaining projection is adapted to be equal to the thickness of the walls of the raceway base section and free arms of the crossbar are adapted to be shorter than half of the width of the transverse strips against which they bear.

15. The device of claim 10, wherein the narrow annular member is provided at the two wall portions thereof with a transverse notch which is disposed at the same level as the retaining projections and on the opposite edges thereto and is dimensioned to allow engagement with the stem of the projection of the wall portion of an adjacent narrow annular member.

16. The device of claim 10, wherein the bottom portion is extended transversely by at least one tab which is provided with an aperture and allows the annular member to be attached through the bottom wall of the raceway in which it is located to a support surface.

17. The device of claim 10, wherein the two free end portions have rounded end edges.

18. A retainer device for conductors in an electrical raceway, the device comprising:
a free end portion;
a bottom portion; and
a side portion between the free end and bottom portions, the side portion having a projection extending therefrom.

19. A retainer device for conductors in an electrical raceway, wherein said raceway is formed by the association of a U-shaped base section defining side walls and a bottom wall, with a flattened cover section, forming a raceway in which said base section is provided in the side walls thereof with equal equidistant narrow transverse slots which define therebetween outstanding transverse tabs or strips, wherein said device is formed by an open narrow annular member of right prismatic profile, said narrow annular member being provided with a bottom portion, two wall portions and two free end portions, all mating with the internal shape of said base section, where the bottom portion of said prismatic profile corresponds to the right internal cross section of said raceway base section, where said two free end portions are located at the level of the open side of said base section, are facing each other in overhanging fashion and are partly overlapping, at the same time as said two wall portions are provided with connecting means for interacting with said side walls of said base section of said raceway and said bottom portion is provided with means for connection to said bottom wall of said raceway base section, wherein retaining projections of one and the other of the wall portions of the narrow annular member comprise the connecting means and are situated in the center of the width of said wall portions.

20. A retainer device for conductors in an electrical raceway, wherein said raceway is formed by the association of a U-shaped base section defining side walls and a bottom wall, with a flattened cover section, forming a raceway in which said base section is provided in the side walls thereof with equal equidistant narrow transverse slots which define therebetween outstanding transverse tabs or strips, wherein said device is formed by an open narrow annular member of right prismatic profile, said narrow annular member being provided with a bottom portion, two wall portions and two free end portions, all mating with the internal shape of said base section, where the bottom portion of said prismatic profile corresponds to the right internal cross section of said raceway base section, where said two free end portions are located at the level of the open side of said base section, are facing each other in overhanging fashion and are partly overlapping, at the same time as said two wall portions are provided with connecting means for interacting with said side walls of said base section of said raceway and said bottom portion is provided with means for connection to said bottom wall of said raceway base section wherein retaining projections of one of the other of the wall portions of the narrow annular member comprise the connecting means and are situated at opposite edges, so as to be symmetrical about a point.

21. A retainer device for conductors in an electrical raceway, wherein said raceway is formed by the association of a U-shaped base section defining side walls and a bottom wall, with a flattened cover section, forming a raceway in which said base section is provided in the side walls thereof with equal equidistant narrow transverse slots which define therebetween outstanding transverse tabs or strips, wherein said device is formed by an open narrow annular member of right prismatic profile, said narrow annular member being provided with a bottom portion, two wall portions and two free end portions, all mating with the internal shape of said base section, where the bottom portion of said prismatic profile corresponds to the right internal cross section of said raceway base section, where said two free end portions are located at the level of the open side of said base section, are facing each other in overhanging fashion and are partly overlapping, at the same time as said two wall portions are provided with connecting means for interacting with said side walls of said base section of said raceway and said bottom portion is provided with means for connection to said bottom wall of said raceway base section, wherein retaining projections comprise the connecting means and may be anchored to the side walls of the raceway base section through the narrow slots of the latter and on two of the adjacent transverse strips thereof.

22. A retainer device for conductors in an electrical raceway, wherein said raceway is formed by the association of a U-shaped base section defining side walls and a bottom wall, with a flattened cover section, forming a raceway in which said base section is provided in the side walls thereof with equal equidistant narrow transverse slots which define therebetween outstanding transverse tabs or strips, wherein said device is formed by an open narrow annular member of right prismatic profile, said narrow annular member being provided with a bottom portion, two wall portions and two free end portions, all mating with the internal shape of said base section, where the bottom portion of said prismatic profile corresponds to the right internal cross section of said raceway base section, where said two free end portions are located at the level of the open side of said base section, are facing each other in overhanging fashion and are partly overlapping, at the same time as said two wall portions are provided with connecting means for interacting with said side walls of said base section of said raceway, said connecting means comprising retaining properties and said bottom portion is provided with means for connection to said bottom wall of said raceway base section, wherein the retaining projections of the narrow annular member are T-shaped, where the width of a stem of the retaining projections of the connecting means is adapted to be the same as the width of the slots of the raceway base section, the length of the stem of the retaining projections is adapted to be equal to a thickness of the walls of the raceway base section and free arms of the crossbar are adapted to be shorter than half of the width of the transverse strips against which they bear.

23. A retainer device for conductors in an electrical raceway, wherein said raceway is formed by the association of a U-shaped base section defining side walls and a bottom wall, with a flattened cover section, forming a raceway in which said base section is provided in the side walls thereof with equal equidistant narrow transverse slots which define therebetween outstanding transverse tabs or strips, wherein said device is formed by an open narrow annular member of right prismatic profile, said narrow annular member being provided with a bottom portion, two wall portions and two free end portions, all mating with the internal shape of said base section, where the bottom portion of said prismatic profile corresponds to the right internal cross section of said raceway base section, where said two free end portions are located at the level of the open side of said base section, are facing each other in overhanging fashion and are partly overlapping, at the same time as said two wall portions are provided with connecting means for interacting with said side walls of said base section of said raceway said connecting means comprising retaining projections and said bottom portion is provided with means for connection to said bottom wall of said raceway base section, wherein the narrow annular member is provided at the two wall portions thereof with a transverse notch which is disposed at the same level as the retaining projections of the connecting means and on the opposite edges thereto and is dimensioned to allow engagement with a stem of the projection of the wall portion of an adjacent narrow annular member.

24. A retainer device for conductors in an electrical raceway, wherein said raceway is formed by the association of a U-shaped base section defining side walls and a bottom wall, with a flattened cover section, forming a raceway in which said base section is provided in the side walls thereof with equal equidistant narrow transverse slots which define therebetween outstanding transverse tabs or strips, wherein said device is formed by an open narrow annular member of right prismatic profile, said narrow annular member being provided with a bottom portion, two wall portions and two free end portions, all mating with the internal shape of said base section, where the bottom portion of said prismatic profile corresponds to the right internal cross section of said raceway base section, where said two free end portions are located at the level of the open side of said base section, are facing each other in overhanging fashion and are partly overlapping, at the same time as said two wall portions are provided with connecting means for interacting with said side walls of said base section of said raceway and said bottom portion is provided with means for connection to said bottom wall of said raceway base section, wherein the bottom portion is extended transversely by at least one tab which is provided with an aperture and allows the annular member to be attached through the bottom wall of the raceway in which it is located to a support surface.

* * * * *